US012045153B1

(12) United States Patent
Perugupalli et al.

(10) Patent No.: US 12,045,153 B1
(45) Date of Patent: Jul. 23, 2024

(54) APPARATUS AND METHOD OF HOT-SWAPPING A COMPONENT OF A COMPONENT UNIT IN A CLUSTER

(71) Applicant: Pramana, Inc., Cambridge, MA (US)

(72) Inventors: Prasanth Perugupalli, Cary, NC (US); Suhash Gerald, Karntaka (IN); Mohammad Abdul Sulaiman, Visakhapatnam (IN); Ganesh Ramamoorthy, Andover, MA (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/538,959

(22) Filed: Dec. 13, 2023

(51) Int. Cl.
*G06F 11/34* (2006.01)
*G06N 20/00* (2019.01)

(52) U.S. Cl.
CPC ......... *G06F 11/3457* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,205,503 B1 * | 3/2001 | Mahalingam | G06F 13/4086 710/72 |
| 6,223,234 B1 * | 4/2001 | Mahalingam | G06F 9/4411 710/1 |
| 6,247,079 B1 | 6/2001 | Papa et al. | |
| 6,418,492 B1 * | 7/2002 | Papa | G06F 13/4027 710/302 |
| 7,519,156 B2 | 4/2009 | Marar | |
| 7,536,061 B2 | 5/2009 | Steinberg et al. | |
| 9,377,480 B2 | 6/2016 | Asahara | |
| 10,016,893 B2 | 7/2018 | Nagai | |
| 11,182,899 B2 | 11/2021 | Raciti et al. | |
| 11,193,950 B2 | 12/2021 | Bueren et al. | |

(Continued)

FOREIGN PATENT DOCUMENTS

| | | |
|---|---|---|
| CN | 212331037 U | 1/2021 |
| WO | 2023145675 A1 | 8/2023 |

OTHER PUBLICATIONS

Alec De Grand; 5 Ways the VS200 Slide Scanner Can Benefit Your Research; Discovery Blog, Nov. 25, 2019.

(Continued)

*Primary Examiner* — Qing Chen
(74) *Attorney, Agent, or Firm* — Caldwell Intellectual Property Law

(57) ABSTRACT

An apparatus and method of hot-swapping a component of a component unit in a cluster. The apparatus includes a memory communicatively connected to at least a processor, the memory contains instructions configuring the at least a processor to receive quality control data from each functioning component of a component unit in at least a cluster, determine a degree of quality of each functioning component of the component unit in the at least a cluster as a function of the quality control data, determine a swappable component in the component unit of the at least a cluster as a function of the degree of quality and initiate a hot-swap procedure for the swappable component, wherein initiating the hot-swap procedure includes deregistering the swappable component from the component unit and registering a replacement component in place of the swappable component to the component unit.

20 Claims, 9 Drawing Sheets

(56) References Cited

U.S. PATENT DOCUMENTS

| | | | |
|---|---|---|---|
| 2007/0006212 A1* | 1/2007 | Kawamoto | G06F 11/1482 717/169 |
| 2018/0024830 A1* | 1/2018 | Kannan | G06F 8/65 711/104 |
| 2022/0318979 A1 | 10/2022 | Chen et al. | |
| 2023/0055997 A1 | 2/2023 | Shah et al. | |
| 2023/0260125 A1 | 8/2023 | Ianni et al. | |

OTHER PUBLICATIONS

Gripper Designs—All in one, (video), Nov. 13, 2020, YouTube, https://www.youtube.com/watch?v=s_UztFdAaTE.

* cited by examiner

APPARATUS AND METHOD OF HOT-SWAPPING A COMPONENT OF A COMPONENT UNIT IN A CLUSTER

FIELD OF THE INVENTION

The present invention generally relates to the field of scanning. In particular, the present invention is directed to an apparatus and method of hot-swapping a component of a component unit in a cluster.

BACKGROUND

Modern computing devices, ranging from servers to personal computers, rely on a variety of electronic components. As technology advances, the demand for flexibility in managing and upgrading these components has grown. Traditionally, replacing, upgrading, or repairing hardware components required shutting down the entire system, resulting in downtime and potential data loss.

SUMMARY OF THE DISCLOSURE

In an aspect, an apparatus for hot-swapping a component of a component unit in a cluster is disclosed. The apparatus includes at least a processor and a memory communicatively connected to the at least a processor, the memory contains instructions configuring the at least a processor to receive quality control data from each functioning component of a component unit in at least a cluster, determine a degree of quality of each functioning component of the component unit in the at least a cluster as a function of the quality control data, determine a swappable component in the component unit of the at least a cluster as a function of the degree of quality and initiate a hot-swap procedure for the swappable component, wherein initiating the hot-swap procedure includes deregistering the swappable component from the component unit of the at least a cluster, wherein deregistering the swappable component includes updating entries in a database to reflect a removal of the swappable component and registering a replacement component in place of the swappable component to the component unit of the at least a cluster, wherein registering the swappable component includes updating the entries in the database to reflect an addition of the replacement component.

In another aspect, a method of hot-swapping a component of a component unit in a cluster is disclosed. The method includes receiving, using at least a processor, quality control data from each functioning component of a component unit in at least a cluster, determining, using the at least a processor, a degree of quality of each functioning component of the component unit in the at least a cluster as a function of the quality control data, determining, using the at least a processor, a swappable component in the component unit of the at least a cluster as a function of the degree of quality and initiating, using the at least a processor, a hot-swap procedure for the swappable component, wherein initiating the hot-swap procedure includes deregistering the swappable component from the component unit of the at least a cluster, wherein deregistering the swappable component includes updating entries in a database to reflect a removal of the swappable component and registering a replacement component in place of the swappable component to the component unit of the at least a cluster, wherein registering the swappable component includes updating the entries in the database to reflect an addition of the replacement component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method of hot-swapping a component of a component unit in a cluster is disclosed. The apparatus includes at least a processor and a memory communicatively connected to the at least a processor, the memory contains instructions configuring the at least a processor to receive quality control data from each functioning component of a component unit in at least a cluster, determine a degree of quality of each functioning component of the component unit in the at least a cluster as a function of the quality control data, determine a swappable component in the component unit of the at least a cluster as a function of the degree of quality and initiate a hot-swap procedure for the swappable component, wherein initiating the hot-swap procedure includes deregistering the swappable component from the component unit of the at least a cluster, wherein deregistering the swappable component includes updating entries in a database to reflect a removal of the swappable component and registering a replacement component in place of the swappable component to the component unit of the at least a cluster, wherein registering the swappable component includes updating the entries in the database to reflect an addition of the replacement component. Exemplary embodiments illustrating aspects of the present disclosure are described below in the context of several specific examples.

Figure 1:
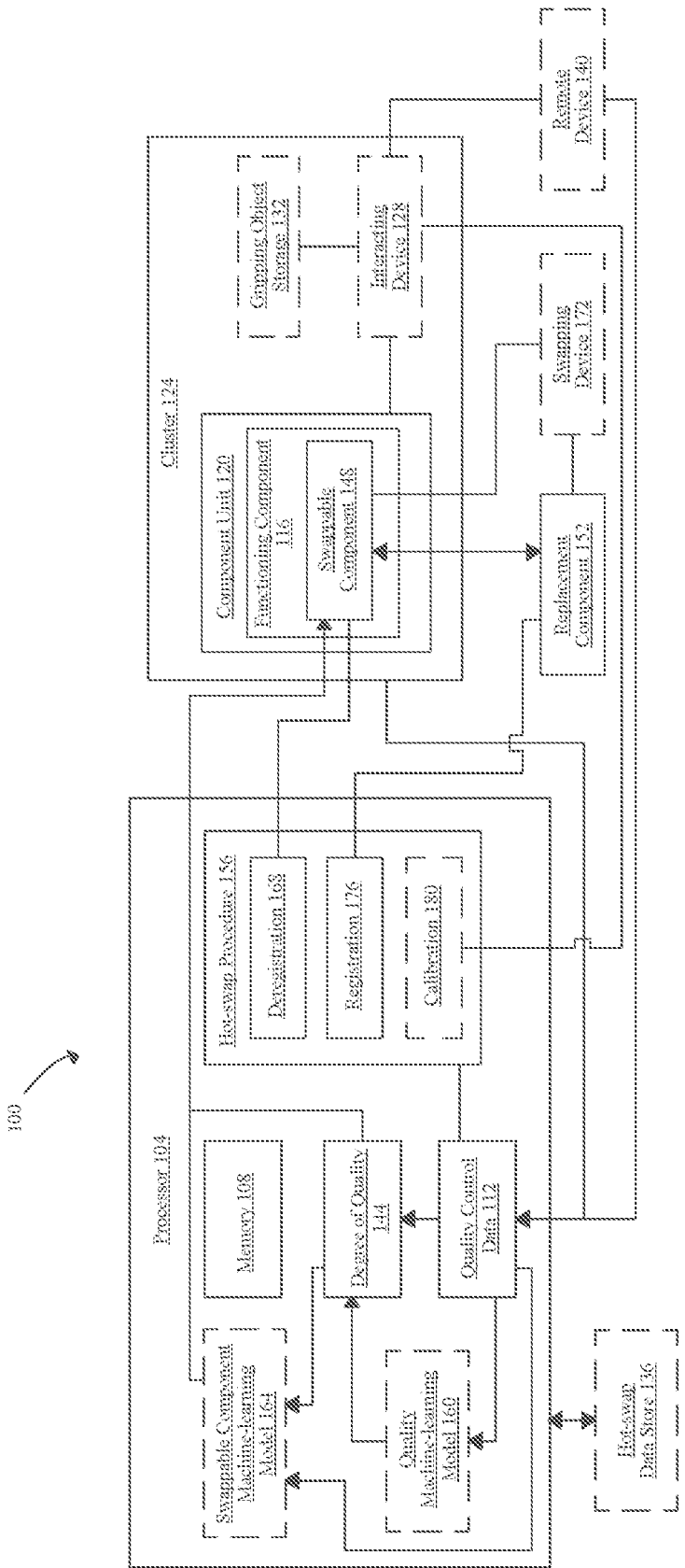
FIG. 1 illustrates a block diagram of an exemplary apparatus for hot-swapping a component of a component unit in a cluster.

Referring now to FIG. 1, an exemplary embodiment of an apparatus 100 for hot-swapping a component of a component unit in a cluster is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Figure 2:
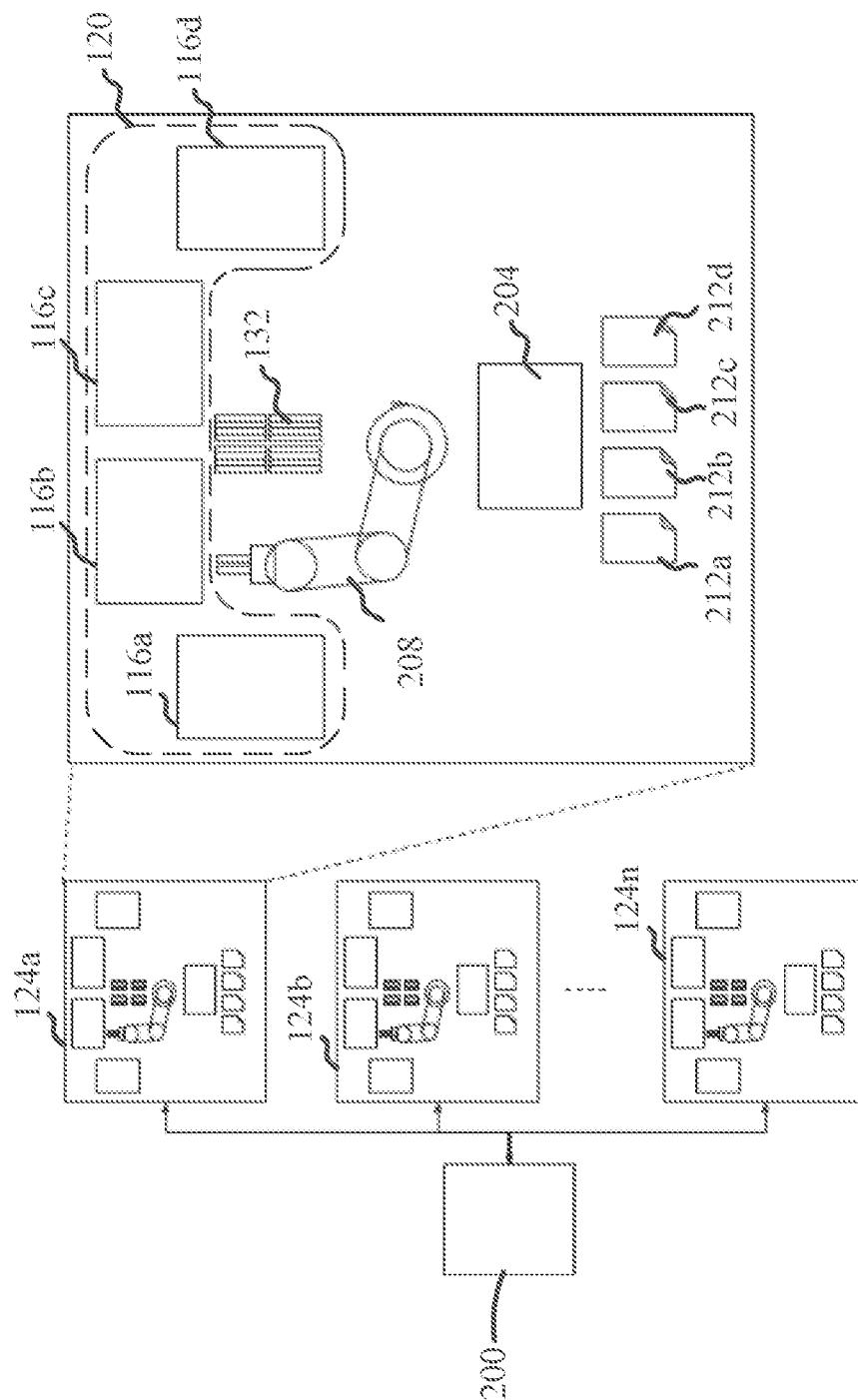
FIG. 2 illustrates a configuration of an exemplary apparatus for hot-swapping a component of a component unit in a cluster.

With continued reference to FIG. 1, memory 108 contains instructions configuring processor 104 to receive quality control data 112 from each functioning component 116 of a component unit 120 in at least a cluster 124. For the purposes of this disclosure, a "cluster" is a group of various components that is gathered to perform a specific task collaboratively. Exemplary cluster 124 may include a component unit 120 including a plurality of functioning components 116, interacting device 128, gripping object storage 132, or the like. In a non-limiting example, cluster 124 may be configured to scan a microscope slide and generate an image of the microscope slide. For the purposes of this disclosure, a "microscope slide" is a thin flat component used to hold objects for examination under a microscope. In another non-limiting example, cluster 124 may be configured to executes instructions of a computer program. In another non-limiting example, cluster 124 may be configured to store data into a hard drive. In some cases, cluster 124 may include a plurality of clusters 124. As a non-limiting example, processor 104 may be configured to receive quality control data 112 from each functioning component 116 of a component unit 120 in five clusters 124 or any numbers of clusters 124. For the purposes of this disclosure, a "component unit" is a group of functioning components that performs similar tasks. In a non-limiting example, component unit 120 may include a plurality of functioning components 116. For the purposes of this disclosure, a "functioning component" is a device or an element of a device that outputs quality control data. Exemplary functioning component 116 may include a scanner, microscope, hard drive, battery, power supply, adapter, or the like. In some embodiments, functioning component 116 may be configured to receive a gripping object from an interacting device 128. Interacting device 128 disclosed herein is further described below. In some embodiments, functioning component 116 may be configured to examine, use, or the like a gripping object. For the purposes of this disclosure, a "gripping object" is an item or material that is designed to be held or grasped by an interacting device. Exemplary gripping object may include microscope slides, workpieces, tools, parts, products, raw materials, or the like. Exemplary configuration of cluster 124, component unit 120 and functioning component 116 is illustrated in FIG. 2. Cluster 124, component unit 120 and functioning component 116 may vary depending on circumstances and persons skilled in the art, upon reviewing the entirety of this disclosure, may appreciate various cluster 124, component unit 120 and functioning component 116 that can be used in apparatus 100. Additional disclosure related to interacting device 128 and gripping object may be found in U.S. patent application Ser. No. 18/385,978, filed on Nov. 1, 2023, entitled "METHOD AND SYSTEM FOR AUTOMATED RETRIEVAL AND SCANNING OF GLASS SLIDES WITHIN A RESTRICTED SPATIAL ENVIRONMENT," which is incorporated herein by reference in its entirety.

With continued reference to FIG. 1, in some embodiments, each functioning component 116, component unit 120 and/or cluster 124 may include a unique identifier or information related to its position; quality control data 112 may include unique identifier of each functioning component 116, component unit 120 and/or cluster 124 and/or information related to its position. For the purposes of this disclosure, a "unique identifier" is an identifier that is unique for an object among others. As a non-limiting example, the unique identifier may include a universal product code (barcode), QR code, radio-frequency identification (RFID), cryptographic hashes, primary key, a unique sequencing of alpha-numeric symbols, or anything of the like that can be used to identify quality control data 112.

With continued reference to FIG. 1, for the purposes of this disclosure, an "interacting device" is a device that interacts with a functioning component to perform a specific task. Exemplary interacting device 128 may include a robotic arm, computing device, or the like. For the purposes of this disclosure, a "robotic arm" is a mechanical device or manipulator that mimics the structure and function of a human arm. In a non-limiting example, a robotic arm may pick up gripping object from a first gripping object storage, carry the gripping object to functioning component 116 and place the gripping object on the functioning component 116. Then, continuing the non-limiting example, the robotic arm may pick the gripping object from the functioning component 116, carry the gripping object to a second gripping object storage and drop the gripping object off to the second gripping object storage. In some cases, robotic arm or may interact with a plurality of functioning component 116. For the purposes of this disclosure, a "gripping object storage" is a container that stores a gripping object. As a non-limiting example, gripping object storage 132 may include a container for picking gripping object up using interacting device 128 or for dropping gripping object off after use. Interacting device 128 disclosed herein may be consistent with a robotic arm described in U.S. patent application Ser. No. 18/382,386, filed on Oct. 20, 2023, entitled "APPARATUS AND METHOD OF USE OF A MECHANISM THAT CONVERTS ROTARY MOTION INTO LINEAR MOTION," which is incorporated herein by reference in its entirety.

With continued reference to FIG. 1, for the purposes of this disclosure, "quality control data" is data collected during an operation of a functioning component. In some embodiments, quality control data 112 may include information related to a performance of functioning component 116. In a non-limiting example, quality control data 112 may include information related to an image generated as a result of operation of functioning component 116 (e.g. scanning a microscope slide). In some cases, the image may be analyzed using a machine vision system as described below. For example, and without limitation, quality control data 112 may include degree of sharpness, contrast, noise, color accuracy, dynamic range, contaminants, or the like. For the purposes of this disclosure, a "contaminant" is any unwanted or foreign substance, particles, or material that potentially interfere with the clarity, quality, or accuracy of the captured image. In another non-limiting example, quality control data 112 may include information related to a performance of a hard drive, battery, power supply, or the like. For example, and without limitation, quality control data 112 may include data transfer rate, capacity, memory speed, battery cycle, discharge rate, output voltage and current, power supply efficiency, noise, or the like. Quality control data 112 may vary depending on the type of functioning component 116 and persons skilled in the art, upon reviewing the entirety of this disclosure, may appreciate various quality control data 112 that can be used in apparatus 100. In some embodiments, quality control data 112 may be stored in hot-swap data store 136. In some embodiments, quality control data 112 may be retrieved from hot-swap data store 136. In some embodiments, processor 104 may generate contaminant presence indicator associated with a contaminant. As used in this disclosure, a "contaminant presence indicator" is a metric, signal, or a set of data points derived from analyzing a captured slide image that suggests or confirms the presence of contaminant. In some embodiments, contaminant presence indicator may be determined using a computer vision model. In some cases, processor 104 may receive slide image from imaging device through data transfer interfaces including, without limitation, USB, ethernet, Wi-Fi, Bluetooth, and/or the like. Captured slide image may be transmitted from an imaging device to processor 104 through a chosen interface in form of signals or data packets. In some embodiments, processor 104 may generate contaminant presence indicator by analyzing slide image for anomalies, inconsistencies, or patterns that are not expected to be part of the actual specimen or slide. Additional disclosure related to contaminant and contaminant presence indicator may be found in U.S. patent application Ser. No. 18/382,345, filed on Oct. 20, 2023, entitled "SYSTEM AND METHODS FOR DETECTING AND CLEANING CONTAMINANTS FROM AN IMAGING OPTICAL PATH," which is incorporated herein by reference in its entirety.

With continued reference to FIG. 1, in some cases, advanced image analysis algorithms, e.g., morphological operations (such as dilation, erosion, opening, or closing), Fourier Transform, scale invariant feature transform (SIFT), image segmentation, edge detection (such as Sobel, Canny, or Prewitt operators), among others may be used to detect and differentiate quality control data 112 from captured image. In a non-limiting example, image may include an image of microscope slide. In some cases, one or more machine learning processes may be incorporated into the analyzing process of slide image, for example, and without limitation, convolutional neural networks (CNN), support vector machines (SVM), random forests, and/or the like may be implemented, by processor 104, for quality control data 112 detection.

With continued reference to FIG. 1, in some cases, processor 104 may be configured to analyze an image using a machine vision system to obtain quality control data 112. In some embodiments, processor 104 may receive an image from interacting device 128, remote device 140, hot-swap data store 136, or the like. For example, and without limitation, processor 104 may receive an image from a scanner, microscope, camera of user device, computing device or controller communicatively connected to functioning component 116 or interacting device 128, or the like. For the purposes of this disclosure, a "machine vision system" is a type of technology that enables a computing device or processor to inspect, evaluate and identify still or moving images. In some cases, a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, quality control data 112 detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, for the purposes of this disclosure, a "hot-swap data store" is a data structure configured to store data associated with a hot-swap procedure. As a non-limiting example, hot-swap data store 136 may store quality control data 112, a degree of quality 144, information related to a swappable component 148, information related to a replacement component 152, and the like. In one or more embodiments, hot-swap data store 136 may include inputted or calculated information and datum related to hot-swap procedure 156. Hot-swap procedure 156 disclosed herein is further described below. In some embodiments, a datum history may be stored in hot-swap data store 136. As a non-limiting example, the datum history may include real-time and/or previous inputted data related to hot-swap procedure 156. As a non-limiting example, hot-swap data store 136 may include instructions from a user, who may be an expert user, a past user in embodiments disclosed herein, or the like, where the instructions may include examples of data related to hot-swap procedure 156.

With continued reference to FIG. 1, in some embodiments, processor 104 may be communicatively connected with hot-swap data store 136. For example, and without limitation, in some cases, hot-swap data store 136 may be local to processor 104. In another example, and without limitation, hot-swap data store 136 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store hot-swap data store 136. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, hot-swap data store 136 may include keywords. As used in this disclosure, a "keyword" is an element of word or syntax used to identify and/or match elements to each other. For example, without limitation, keyword may include a "number of functioning component 116 of a component unit 120" in the instance that a user or processor 104 is looking for a specific functioning component 116 of a specific component unit 120 in a specific cluster 124.

With continued reference to FIG. 1, in some embodiments, hot-swap data store 136 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 104 may be configured to receive quality control data 112 from functioning component 116, interacting device 128, remote device 140, or the like. In a non-limiting example, processor 104 may receive quality control data 112 directly from a scanner or imaging device (functioning component 116) that scanned a microscope slide. In some cases, scanners or imaging devices (functioning component 116) may include devices or systems used to digitize slides containing biomedical specimens (e.g., tissue samples). As a non-limiting example, scanners or imaging devices (functioning component 116) may include digital cameras, digital microscopes, digital pathology scanners, or the like. In some embodiments, processor 104 may be configured to receive quality control data 112 from remote device 140. For the purposes of this disclosure, a "remote device" is an external device to processor 104. Exemplary remote device 140 may include a computing device, processor, external device, and the like thereof. In some cases, remote device 140 may be communicatively connected to interacting device 128 or functioning component 116; remote device 140 may receive data from interacting device 128 or functioning component 116 and generate quality control data 112 as a function of the data received from interacting device 128 or functioning component 116. As a non-limiting example, scanners or imaging devices (functioning component 116) may be communicatively coupled to processor 104 and/or remote device 140 using a network. As a non-limiting example, network may include one or more local area networks (LANs), wide area networks (WANs), wired networks, wireless networks, the Internet, or any network described in this disclosure. In a non-limiting example, scanners or imaging devices (functioning component 116) may communicate with processor 104 over network using the TCP/IP protocol or other suitable networking protocols. During operation of scanners or imaging devices (functioning component 116), scanners or imaging devices (functioning component 116) may capture digital images of slides and send them to processor 104 and/or remote device 140 using network. For efficient storage and/or transmission, images may be compressed prior to or during transmission. Security measures such as encryption, authentication (including multi-factor authentication), SSL, HTTPS, and other security techniques may also be applied. In some embodiments, processor 104 and/or remote device 140 may be configured to control the operation of scanners or imaging devices (functioning component 116) to automate the slide digitization process. For example, and without limitation, processor 104 and/or remote device 140 may send instructions to scanners or imaging devices (functioning component 116) to scan or rescan selected portions of a slide (e.g., areas identified by x-, y-, and/or z-coordinates or bounding boxes). In some cases, processor 104 and/or remote device 140 may further select parameters associated with scanners or imaging devices (functioning component 116), such as magnification level, focus settings, scanning pattern, or the like. In some cases, remote device 140 may include a user device. For the purposes of this disclosure, a "user device" is any device that a user uses to input data. As a non-limiting example, user device may include a laptop, desktop, tablet, mobile phone, smart phone, smart watch, kiosk, screen, smart headset, or things of the like. In some embodiments, user device may include an interface configured to receive inputs from user. In some embodiments, user may manually input any data (e.g. quality control data 112) into apparatus 100 using user device. In some embodiments, user may have a capability to process, store or transmit any information independently. Additional disclosure related to scanners and slide digitization process may be found in U.S. Patent Application No. 63/466,950, filed on May 16, 2023, entitled "SYSTEMS AND METHODS FOR INLINE QUALITY CONTROL OF SLIDE DIGITIZATION," which is incorporated herein by reference in its entirety.

With continued reference to FIG. 1, memory 108 contains instructions configuring processor 104 to determine a degree of quality 144 of each functioning component 116 of component unit 120 in at least a cluster 124 as a function of quality control data 112. For the purposes of this disclosure, a "degree of quality" of a functioning component is a measure of a quality that a functioning component can output during operations. In an embodiment, degree of quality 144 may include a quantitative characteristic, such as a numerical value within a set range. As a non-limiting example, degree of quality 144 may include 0, 1, 2, 3, 5, 10, 20, 100, or any numerical value thereof. For example, and without limitation, degree of quality 144 may include a '2' for a range of 0-10, where '0' may represent the worst quality of an output a functioning component 116 generated (quality control data 112) and '10' represents the best quality of an output a functioning component 116 generated (quality control data 112). As another non-limiting example, degree of quality 144 may include a percentage value within a range of 0-100%. In other non-limiting embodiments, degree of quality 144 may include a quality characteristic, such as a color coding, where each color is associated with a level of quality of quality control data 112. As a non-limiting example, degree of quality 144 may be red, where red may represent a minimum and/or worst quality of quality control data 112. As another non-limiting example, degree of quality 144 may be green, where green may represent maximum or best quality of quality control data 112. As another non-limiting example, degree of quality 144 may be light grey when there is minimum and/or worst quality of quality control data 112 and the color may get darker as the quality of quality control data 112 increases. In some embodiments, degree of quality 144 may include low to high scoring. As a non-limiting example, degree of quality 144 may be low' when quality control data 112 includes minimum and/or worst quality and degree of quality 144 may be 'high' when quality control data 112 includes maximum or best quality. In some cases, degree of quality 144 may include a binary output e.g., "TRUE/POS (i.e., positive)" as "contaminant present" or "FALSE/NEG (i.e., negative)" as "contaminant is not present." In some embodiments, degree of quality 144 may be updated in real-time as processor 104 receives new quality control data 112. In some embodiments, user may manually input degree of quality 144.

With continued reference to FIG. 1, in some embodiments, processor 104 may be configured to determine a degree of quality 144 of functioning component 116 using a quality threshold. For the purposes of this disclosure, a "quality threshold" is a predefined limit that serves as a benchmark for determining a degree of quality. As a non-limiting example, quality threshold may include a numerical value. For example, and without limitation, quality threshold may include any numerical value of sharpness, contrast, noise, color accuracy, dynamic range, or the like. For example, and without limitation, quality threshold may include any numerical value of data transfer rate, capacity, memory speed, battery cycle, discharge rate, output voltage and current, power supply efficiency, noise, or the like. In some cases, quality threshold may include a binary output. As a non-limiting example, quality threshold may include true, positive, false, negative, the like. For example, and without limitation, when quality threshold includes 'negative' for contaminant for high value of degree of quality 144, processor 104 may determine that degree of quality 144 includes a high value for quality control data 112 that includes false or negative for contaminant. In some embodiments, quality threshold may include different thresholds for different quality control data 112. In a non-limiting example, quality threshold may include a first threshold for a degree of sharpness (quality control data 112) and a second threshold for a degree of noise (quality control data 112). In some cases, if quality control data 112 exceeds quality threshold, processor 104 may determine that degree of quality 144 includes 'high' or any numerical value that indicates that quality control data 112 has high level of quality. In some cases, if quality control data 112 does not exceed quality threshold, processor 104 may determine that degree of quality 144 includes 'low' or any numerical value that indicates that quality control data 112 has low level of quality. In some cases, if even one parameters of quality control data 112 does not exceed quality threshold that is predefined for the different parameters of quality control data 112, degree of quality 144 for functioning component 116 may include a 'low' score. Processor 104 may obtain quality threshold from hot-swap data store 136 or user may manually input quality threshold. Processor 104 may use quality threshold that was previously used.

With continued reference to FIG. 1, in some embodiments, processor 104 may be configured to determine a degree of quality 144 using a quality machine-learning model 160. In some cases, processor 104 may be configured to generate quality training data. In a non-limiting example, quality training data may include correlations between exemplary quality control data and exemplary degrees of quality. For example, and without limitation, quality training data may include correlations between a degree of sharpness and noise (quality control data 112) and a degree of quality 144. In some embodiments, quality training data may be stored in hot-swap data store 136. In some embodiments, quality training data may be received from one or more users, hot-swap data store 136, external computing devices, and/or previous iterations of processing. As a non-limiting example, quality training data may include instructions from a user, who may be an expert user, a past user in embodiments disclosed herein, or the like, which may be stored in memory and/or stored in hot-swap data store 136, where the instructions may include labeling of training examples. In some embodiments, quality training data may be updated iteratively on a feedback loop. As a non-limiting example, processor 104 may update quality training data iteratively through a feedback loop as a function of quality control data 112, or the like. In some embodiments, processor 104 may be configured to generate quality machine-learning model 160. In a non-limiting example, generating quality machine-learning model 160 may include training, retraining, or fine-tuning quality machine-learning model 160 using quality training data or updated quality training data. In some embodiments, processor 104 may be configured to determine a degree of quality 144 using quality machine-learning model 160 (i.e. trained or updated quality machine-learning model 160). In some embodiments, generating training data and training machine-learning models may be simultaneous.

With continued reference to FIG. 1, in some embodiments, processor 104 may be configured to determine a degree of quality 144 using a quality lookup table. As a non-limiting example, processor 104 may be configured to 'lookup' given quality control data 112 and find a corresponding degree of quality 144 using quality lookup table. For example, without limitation, processor 104 may 'lookup' given degree of noise and sharpness and find corresponding degree of quality 144. A "lookup table," for the purposes of this disclosure, is an array of data that maps input values to output values. The lookup table may be used to replace a runtime computation with an array indexing operation. In an embodiment, the lookup table may include interpolation. For the purposes of this disclosure, an "interpolation" refers to a process for estimating values that lie between known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, memory 108 contains instructions configuring processor 104 to determine a swappable component 148 in a component unit 120 of at least a cluster 124. In some embodiments, processor 104 may determine a plurality of swappable components 148 in component unit 120 of cluster 124. For the purposes of this disclosure, a "swappable component" is a functioning component that needs to be swapped with another component as the functioning component produces a low quality of output. In some embodiments, processor 104 may be configured to determine swappable component 148 by determining that functioning component 116 is swappable or not swappable (or un-swappable). For the purposes of this disclosure, "swappable" refers to the capability of easily replacing or interchanging one component, part, or element with another, often without interrupting the overall operation or functionality of a system or device. For the purposes of this disclosure, "un-swappable component" refers to a functioning component that does not require a hot-swap procedure as the functioning component produces a high quality of output. Processor 104 is configured to determine a swappable component 148 in a component unit 120 in at least a cluster 124 as a function of a degree of quality 144. In a non-limiting example, swappable component 148 may include functioning component 116 that includes low degree of quality 144 while un-swappable component includes a high degree of quality 144. In some cases, swappable component 148 may be stored in hot-swap data store 136.

With continued reference to FIG. 1, in some embodiments, processor 104 may be configured to determine swappable component 148 using a swappable component threshold. For the purposes of this disclosure, a "swappable component threshold" is a predefined limit that serves as a benchmark for determining a swappable component. As a non-limiting example, swappable component threshold may include a numerical value. For example, and without limitation, swappable component threshold may include any numerical value of degree of quality 144. In some cases, swappable component threshold may be consistent with a degree of quality 144. For example, and without limitation, swappable component threshold may include any numerical value of within a range of 0-10, 0-100%, or the like. In some cases, swappable component threshold may include any characteristic value. For example, and without limitation, swappable component threshold may include a specific color, grey scale, specific level between low and high level, or the like. In some cases, if a degree of quality 144 of a functioning component 116 does not exceed swappable component threshold, processor 104 may determine the functioning component 116 is not a swappable component 148. For example, and without limitation, if a degree of quality 144 of functioning component 116 includes 80% and swappable component threshold includes 40%, then processor 104 may determine that the functioning component 116 is not swappable or swappable component 148. In some cases, if a degree of quality 144 of a functioning component 116 exceeds swappable component threshold, processor 104 may determine the functioning component 116 is a swappable component 148. For example, and without limitation, if a degree of quality 144 of functioning component 116 includes 20% and swappable component threshold includes 30%, then processor 104 may determine that the functioning component 116 is swappable or swappable component 148. Processor 104 may obtain swappable component threshold from hot-swap data store 136 or user may manually input swappable component threshold. Processor 104 may use swappable component threshold that was previously used.

With continued reference to FIG. 1, in some embodiments, processor 104 may be configured to determine a swappable component 148 using a swappable component machine-learning model 164. In some cases, processor 104 may be configured to generate swappable component training data. In a non-limiting example, swappable component training data may include correlations between exemplary quality control data or exemplary degree of quality and exemplary swappable components. For example, and without limitation, processor 104 may determine if functioning component 116 of a component unit 120 in a cluster 124 that includes a degree of sharpness and noise (quality control data 112) is swappable or not swappable using swappable machine-learning model that is trained with swappable component training data. For example, and without limitation, swappable component training data may include correlations between a degree of quality 144 of functioning component 116 and whether the functioning component 116 is swappable or not swappable. In some embodiments, swappable component training data may be stored in hot-swap data store 136. In some embodiments, swappable component training data may be received from one or more users, hot-swap data store 136, external computing devices, and/or previous iterations of processing. As a non-limiting example, swappable component training data may include instructions from a user, who may be an expert user, a past user in embodiments disclosed herein, or the like, which may be stored in memory and/or stored in hot-swap data store 136, where the instructions may include labeling of training examples. In some embodiments, swappable component training data may be updated iteratively on a feedback loop. As a non-limiting example, processor 104 may update swappable component training data iteratively through a feedback loop as a function of quality control data 112, degree of quality 144, output of quality machine-learning model, or the like. In some embodiments, processor 104 may be configured to generate swappable component machine-learning model 164. In a non-limiting example, generating swappable component machine-learning model 164 may include training, retraining, or fine-tuning swappable component machine-learning model 164 using swappable component training data or updated swappable component training data. In some embodiments, processor 104 may be configured to determine or identify swappable component 148 in a component unit 120 of a cluster 124 using swappable component machine-learning model 164 (i.e. trained or updated swappable component machine-learning model 164). In some embodiments, generating training data and training machine-learning models may be simultaneous.

With continued reference to FIG. 1, memory 108 contains instructions configuring processor 104 to initiate a hot-swap procedure 156 for swappable component 148. For the purposes of this disclosure, a "hot-swap procedure" is the process of replacing or adding components to a system or device without shutting down or powering off the entire system. In a non-limiting example, processor 104 may be configured to initiate hot-swap procedure 156 to replace swappable component 148 with a replacement component 152 while other components of component unit 120 and/or cluster 124 is still running. For the purposes of this disclosure, a "replacement component" is a component that can substitute a swappable component. In some embodiments, replacement component 152 may be consistent with functioning component 116. In some embodiments, replacement component 152 may include a high degree of quality 144. In some embodiments, processor 104 may be configured to find replacement component 152 that is suitable to be used to in place of swappable component 148 without causing any failure or error in component unit 120 and/or cluster 124 using hot-swap data store 136, replacement lookup table, or the like. For example, and without limitation, processor 104 may query hot-swap data store 136 to find replacement component 152 using keyword that includes swappable component 148. In some cases, replacement lookup table may include replacement component 148 for given corresponding swappable component 148. In a non-limiting example, processor 104 may determine replacement component 152 that is available and compatible to swappable component 148 for given swappable component 148 using a replacement lookup table.

With continued reference to FIG. 1, initiating hot-swap procedure 156 includes deregistering swappable component 148 from component unit 120 of at least a cluster 124. For the purposes of this disclosure, "deregistration" refers to the process of removing or unregistering a specific part or element from a unit. In a non-limiting example, deregistration 168 (hot-swap procedure 156) of swappable component 148 from component unit 120 of cluster 124 may include physical removal of swappable component 148 from component unit 120 of cluster 124. For example, and without limitation, a user may manually remove swappable component 148 from component unit 120 of cluster 124. For example, and without limitation, swappable component 148 may be physically removed from component unit 120 of cluster 124 using a swapping device 172.

With continued reference to FIG. 1, for the purposes of this disclosure, a "swapping device" is an automated device that moves a swapping component and replacement component in and out of a component unit. As a non-limiting example, swapping device 172 may be actuated using at least an actuator. For the purposes of this disclosure, an "actuator" is a component of a machine that is responsible for moving and/or controlling a mechanism or system. Actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or human power. In some cases, actuator may have an energy or power source other than control signal. This may include a main energy source, which may include for example electric power, hydraulic power, pneumatic power, mechanical power, and the like. In some cases, upon receiving a control signal, actuator may respond by converting source power into mechanical motion. In some cases, actuator may be understood as a form of automation or automatic control.

With continued reference to FIG. 1, in some embodiments, processor 104 may be configured to generate a hot-swap command for a swapping device 172 to replace swappable component 148 to replacement component 152. For the purposes of this disclosure, a "hot-swap command" is a specific instruction or set of instructions issued to a swapping device to initiate a hot-swapping procedure. Exemplary hot-swap command may include a position of swappable component 148 in component unit 120 of cluster 124 to remove swappable component 148 or add replacement component 152. Exemplary hot-swap command may include a unique identifier of swappable component 148. Exemplary hot-swap command may include position or unique identifier of component unit 120 and/or cluster 124 that swappable component 148 is located in. In a non-limiting example, processor 104 may be configured to generate a hot-swap command for a swapping device 172 to remove swappable component 148 from component unit 120 of cluster 124 and put replacement component 152 to component unit 120 of cluster 124 in the position of the removed swappable component 148. In a non-limiting example, swapping device 172 may be configured to move on a track, enabling swapping device 172 to move to a position of swappable component 148 and/or replacement component 152. As a non-limiting embodiment, swapping device 172 may move along track using one or more wheels. Swapping device 172 may be configured to move on a track to pick up or drop off swappable component 148 and/or replacement component 152. In some cases, swapping device 172 may be configured to verify swappable component 148 and/or replacement component 152 by scanning unique identifier of swappable component 148 and/or replacement component 152 and retrieving information related to the unique identifier.

With continued reference to FIG. 1, in another non-limiting example, deregistration 168 (hot-swap procedure 156) of swappable component 148 from component unit 120 of cluster 124 may include updating system records, configurations, or software settings to reflect the removal of swappable component 148. This may ensure that component unit 120 and/or cluster 124 operates correctly without the presence of the deregistered swappable component 148. For example, and without limitation, cluster 124 may operate to scan microscope slide using an interacting device 128 and functioning components 116 in a component unit 120 of cluster 124 while swappable component 148 is removed from the component unit 120. In some cases, deregistration 168 of swappable component 148 includes updating entries in a database to reflect a removal of swappable component 148. In a non-limiting example, processor 104 may be configured to remove information, such as but not limited to unique identifier of swappable component 148, information related to swappable component 148, or the like, in hot-swap data store 136. In some cases, deregistration 168 may include communicating deregistration 168 with a processor 104.

With continued reference to FIG. 1, initiating hot-swap procedure 156 includes registering replacement component 152 in place of swappable component 148 to component unit 120 of at least a cluster 124. For the purposes of this disclosure, "registration" refers to the process of adding or registering a specific part or element of a unit. In a non-limiting example, registration 176 (hot-swap procedure 156) of replacement component 152 into component unit 120 of cluster 124 in place of swappable component 148 that is removed from component unit 120 of cluster 124 may include physical addition of replacement component 152 into component unit 120 of cluster 124. For example, and without limitation, a user may manually add or register replacement component 152 into component unit 120 of cluster 124. For example, and without limitation, replacement component 152 may be physically added into component unit 120 of cluster 124 using a swapping device 172. In a non-limiting example, swapping device 172 may be configured to add or register replacement component 152 at the position of swappable component 148 that was removed from component unit 120 of cluster 124.

With continued reference to FIG. 1, in another non-limiting example, registration 176 (hot-swap procedure 156) of replacement component 152 into component unit 120 of cluster 124 may include updating system records, configurations, or software settings to reflect the addition or registration 176 of swappable component 148. This may ensure that component unit 120 and/or cluster 124 operates correctly with the presence of the registered replacement component 152. For example, and without limitation, cluster 124 may operate to scan microscope slide using an interacting device 128 and functioning components 116 in a component unit 120 of cluster 124 with replacement component 152 added into the component unit 120. In some cases, registration 176 of replacement component 152 includes updating entries in a database to reflect an addition of replacement component 152 in place of swappable component 148. In a non-limiting example, processor 104 may be configured to modify or add information, such as but not limited to unique identifier of replacement component 152, information related to replacement component 152, or the like, in hot-swap data store 136.

With continued reference to FIG. 1, in some embodiments, initiating hot-swap procedure 156 may include storing a swappable operational state of swappable component 148 in a hot-swap data store 136. For the purposes of this disclosure, a "swappable operational state" is the condition or mode of operation of a swappable component. In some cases, swappable operational state may be stored in a data structure. As a non-limiting example, swappable operational state of swappable component 148 may include a state of swappable component 148 in scanning process, calibration, execution of specific instructions, powering an object, or the like. As another non-limiting example, swappable operational state of swappable component 148 may include parameters of swappable component 148 set to operate. For example, and without limitation, swappable operational state of swappable component 148 may include a level of resolution, magnification, color depth, focus, pixel calibration, color calibration, or the like. Persons skilled in the art, upon reviewing the entirety of this disclosure, may appreciate various swappable operational state that can be used in apparatus 100. In some embodiments, swappable operational state may be stored in hot-swap data store 136 or database. In some embodiments, initiating hot-swap procedure 156 may include setting a replacement operational state of replacement component 152 to stored swappable operational state. For the purposes of this disclosure, a "replacement operational state" is the condition or mode of operation of a replacement component. In some embodiments, replacement operational state may be consistent with swappable operational state. Replacement operational state of replacement component 152 may be set to the value of swappable operational state of swappable component 148 to allow smooth registration of replacement component 152 in place of swappable component 148 and smooth operation of replacement component 152 without disrupting any operations of other functioning components 116 in component unit 120 of cluster 124.

With continued reference to FIG. 1, hot-swap procedure 156 may include calibration 180 of interacting device 128 for replacement component 152. For the purposes of this disclosure, a "calibration" of an interacting device refers to the process of adjusting and verifying the accuracy and precision of an interacting device. In some embodiments, processor 104 may be configured to calibrate an operation position of interacting device 128. For the purposes of this disclosure, an "operation position" is the position of an interacting device to operate to perform a specific task. In a non-limiting example, operation position may include a specific orientation or position of interacting device 128 to place a gripping object on functioning component 116 and/or replacement component 152. For example, and without limitation, operation position may include a specific orientation or position of at least an actuator of interacting device 128, wherein the at least an actuator may be configured to actuate interacting device 128 to perform specific tasks; for instance, gripping and releasing a gripping object, picking a gripping object from gripping object storage and dropping the gripping object on functioning component 116 and/or replacement component 152. In some embodiments, processor 104 may be configured to calibrate an operation position of interacting device 128 as a function of a replacement component position in cluster 124 with respect to a position of interacting device 128. For the purposes of this disclosure, a "replacement component position" is the position of a replacement component in a component unit. In some embodiments, processor 104 may be configured to determine replacement component position with respect to a position of an interacting device 128 in at least a cluster 124 using a fiducial marker of replacement component 152. For the purposes of this disclosure, a "fiducial marker" is a reference point or object used to establish a known point of reference. In a non-limiting example, fiducial marker may include any signs, symbols, marks, or the like for a computing device or processor 104 to analyze a position of replacement component 152. Exemplary fiducial marker may include paper, plastic, metal, fabric, or the like. In some cases, fiducial marker may be embedded on replacement component 152. In a non-limiting example, position of replacement component 152 may include a distance between fiducial marker of replacement component 152 and interacting device 128. In some embodiments, processor 104 may be configured to determine replacement component position with respect to a position of an interacting device 128 in at least a cluster 124 using a fiducial marker of replacement component 152 using machine vision system. Machine vision system is described in detail above.

With continued reference to FIG. 1, in some embodiments, processor 104 may be configured to receive a user input. For the purposes of this disclosure, a "user input" is any data inputted by a user. In some embodiments, user may manually input a user input using a user interface of a user device of remote device 140. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with a user. For example, a user may interact with user interface in virtual reality. In some embodiments, a user may interact with the use interface using a computing device distinct from and communicatively connected to at least a processor 104. For example, a smart phone, smart watch, tablet, desktop, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, user input may include a hot-swap confirmation. For the purposes of this disclosure, a "hot-swap confirmation" is a user's judgement on initiating of a hot-swap procedure. As a non-limiting example, hot-swap confirmation may include an approval or disapproval. For example, and without limitation, user may input an approval of hot-swap confirmation to approve the initiation of hot-swap procedure 156. For example, and without limitation, user may input a disapproval of hot-swap confirmation to disapprove the initiation of hot-swap procedure 156. In some embodiments, processor 104 may be configured to initiate hot-swap procedure 156 as a function of user input. For example, and without limitation, if user input includes an approval of hot-swap confirmation, processor 104 may initiate hot-swap procedure 156. For example, and without limitation, if user input includes a disapproval of hot-swap confirmation, processor 104 may not initiate hot-swap procedure 156.

With continued reference to FIG. 1, in some embodiments, processor 104 may be configured to generate an indicating datum as a function of a completion of hot-swap procedure 156 and transmit the indicating datum to a user. For the purposes of this disclosure, an "indicating datum" is an indication to inform a user related to a hot-swap procedure. Exemplary indicating datum may include audio, text, image, vibration, and the like. For example, and without limitation, indicating datum may include a text message, email, notification sound, phone call, notification banner, application notification, or the like. In some cases, processor 104 may generate indicating datum as a function of a completion of each process of hot-swap procedure 156. As a non-limiting example, processor 104 may generate indicating datum as a function of completion of deregistration of swappable component 148, registration 176 of replacement component 152, calibration 180 of interacting device 128, storing of a swappable operational state, setting of a replacement operational state, or any other process of hot-swap procedure 156 thereof.

Referring now to FIG. 2, a configuration of an exemplary apparatus 100 for hot-swapping a component of a component unit in a cluster is illustrated. Apparatus 100 includes processor 104. In a non-limiting example, processor 104 may include a plurality of processors. For example, and without limitation, processor 104 may include a cluster management system 200 and a cluster controller 204. In a non-limiting example, cluster management system 200 and/or cluster controller 204 may be configured to initiate hot-swap procedure 156. In a non-limiting example, cluster management system 200 and cluster controller 204 may be consistent with any processor disclosed in this disclosure. In some embodiments, cluster management system 200 and cluster controller 204 may operate in concert in order to carry out hot-swap procedure 156. In some cases, cluster management system 200 and/or cluster controller 204 may be configured to receive quality control data 112 from each functioning component 116 of a component unit 120 of a plurality of clusters 124a-n and initiate hot-swap procedure 156 for swappable component 148 of component unit 120 of the plurality of clusters 124a-n as shown in FIG. 2. In a non-limiting example, functioning component 116 may include a scanner. In FIG. 2, cluster 124a is illustrated in detail. Cluster 124a includes a component unit 120 that includes four functioning component 116a-d as shown in FIG. 2. Cluster 124 may include an interacting device 128. Interacting device 128 may include a robotic arm 208 as shown in FIG. 2. In a non-limiting example, a robotic arm 208 may pick up a gripping object from a gripping object storage 132, carry the gripping object to functioning component 116 and place the gripping object on the functioning component 116. Then, continuing the non-limiting example, the robotic arm 208 may pick the gripping object from the functioning component 116, carry the gripping object to the gripping object storage 132 and drop the gripping object off to the gripping object storage 132. Cluster controller 204 may be communicatively connected to interacting device 128 and/or cluster management system 200. Cluster management system 200 may receive quality control data 112 from cluster controller 204. In some embodiments, functioning component 116a-d and/or swappable component 148 may include a swappable operational state 212a-d. As a non-limiting example, swappable operational state 212a-d of swappable component 148 or functioning component 116a-d may include a state of swappable component 148 or functioning components 116a-d in scanning process, calibration, execution of specific instructions, powering an object, or the like. As another non-limiting example, swappable operational state 212-ab of swappable component 148 or functioning components 116a-d may include parameters of swappable component 148 or functioning components 116a-d set to operate. For example, and without limitation, swappable operational state 212a-d of swappable component 148 or functioning components 116a-d may include a level of resolution, magnification, color depth, focus, pixel calibration, color calibration, or the like. In some cases, a cluster management system 200 and/or a cluster controller 204 may be communicatively connected to hot-swap data store 136. In a non-limiting example, hot-swap data store 136 may be iteratively updated as a function of any actions, changes or updates made from cluster management system 200 and/or cluster controller 204. In some embodiments, deregistration and registration of components may be performed by cluster controller 204. In some embodiments, a first hot-swap data store may be communicatively connected to cluster controller 204. Cluster controller 204 may perform registration and/or deregistration of components using first hot-swap data store. In some embodiments, cluster controller 204 may communicate with cluster management system to sync the contents of first hot swap data store with the contents of a second hot swap data store that is communicatively connected to cluster management system 200. In some cases, this synchronization may occur at a set time interval, such as every 10 minutes, hourly, every 3 hours, daily, and the like. In some cases, this synchronization may occur at a set time interval, such as every 1 minute.

Figure 3:
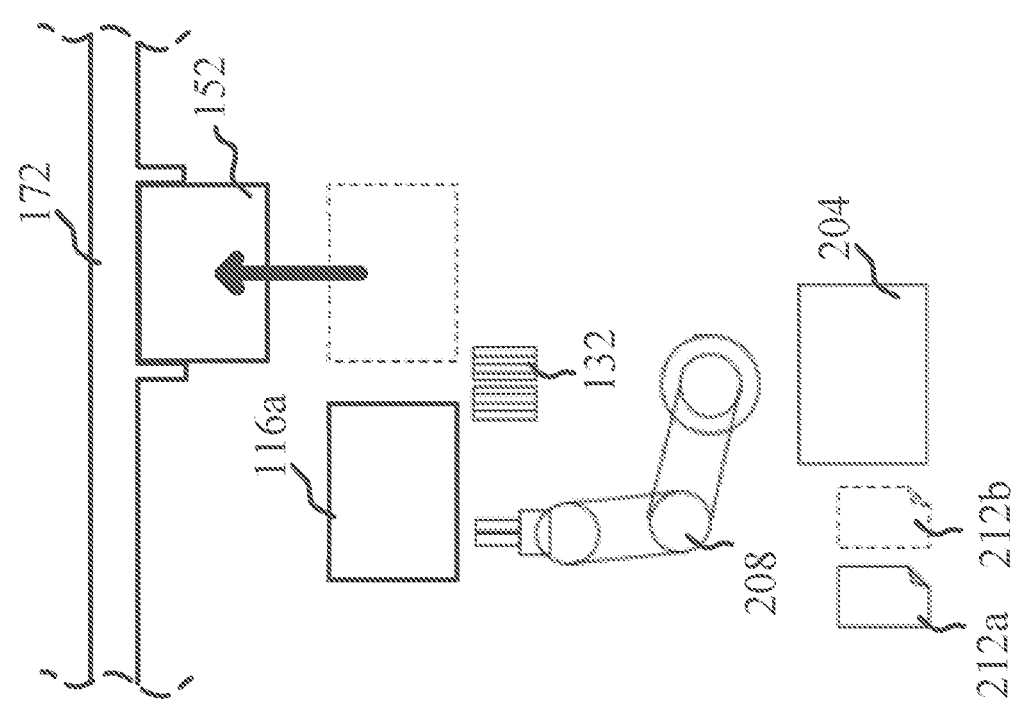
FIG. 3 illustrates an exemplary configuration of swapping a component of a component unit using a swapping device.

Referring now to FIG. 3, an exemplary configuration of swapping a component of a component unit using a swapping device is illustrated. In a non-limiting example, swapping device 172 may be configured to move swappable component 148 and/or replacement component 152 as a function of a hot-swap command. Exemplary hot-swap command may include a position of swappable component 148 in component unit 120 of cluster 124 to remove swappable component 148 or add replacement component 152. Exemplary hot-swap command may include a unique identifier of swappable component 148. Exemplary hot-swap command may include position or unique identifier of component unit 120 and/or cluster 124 that swappable component 148 is located in. In a non-limiting example, cluster management system 200 may be configured to generate a hot-swap command for a swapping device 172 to remove swappable component 148 from component unit 120 of cluster 124 and put replacement component 152 to component unit 120 of cluster 124 in the position of the removed swappable component 148. For example, and without limitation, if a cluster 124 includes a component unit 120 that includes a first functioning component 116a that is not swappable and second functioning component that is determined to be swappable component 148, cluster management system 200 may generate a hot-swap command for swapping device 172 to pick up the swappable component 148 and replace the swappable component 148 to replacement component 152. Continuing the non-limiting example, swappable operational state 212b of swappable component 148 stored in hot-swap data store 136, which can be used as replacement operational state for the replacement component 152. As a non-limiting example, swapping device 172 may be actuated using at least an actuator. Actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or human power. In some cases, actuator may have an energy or power source other than control signal. This may include a main energy source, which may include for example electric power, hydraulic power, pneumatic power, mechanical power, and the like. In some cases, upon receiving a control signal, actuator may respond by converting source power into mechanical motion. In some cases, actuator may be understood as a form of automation or automatic control.

Figure 4:
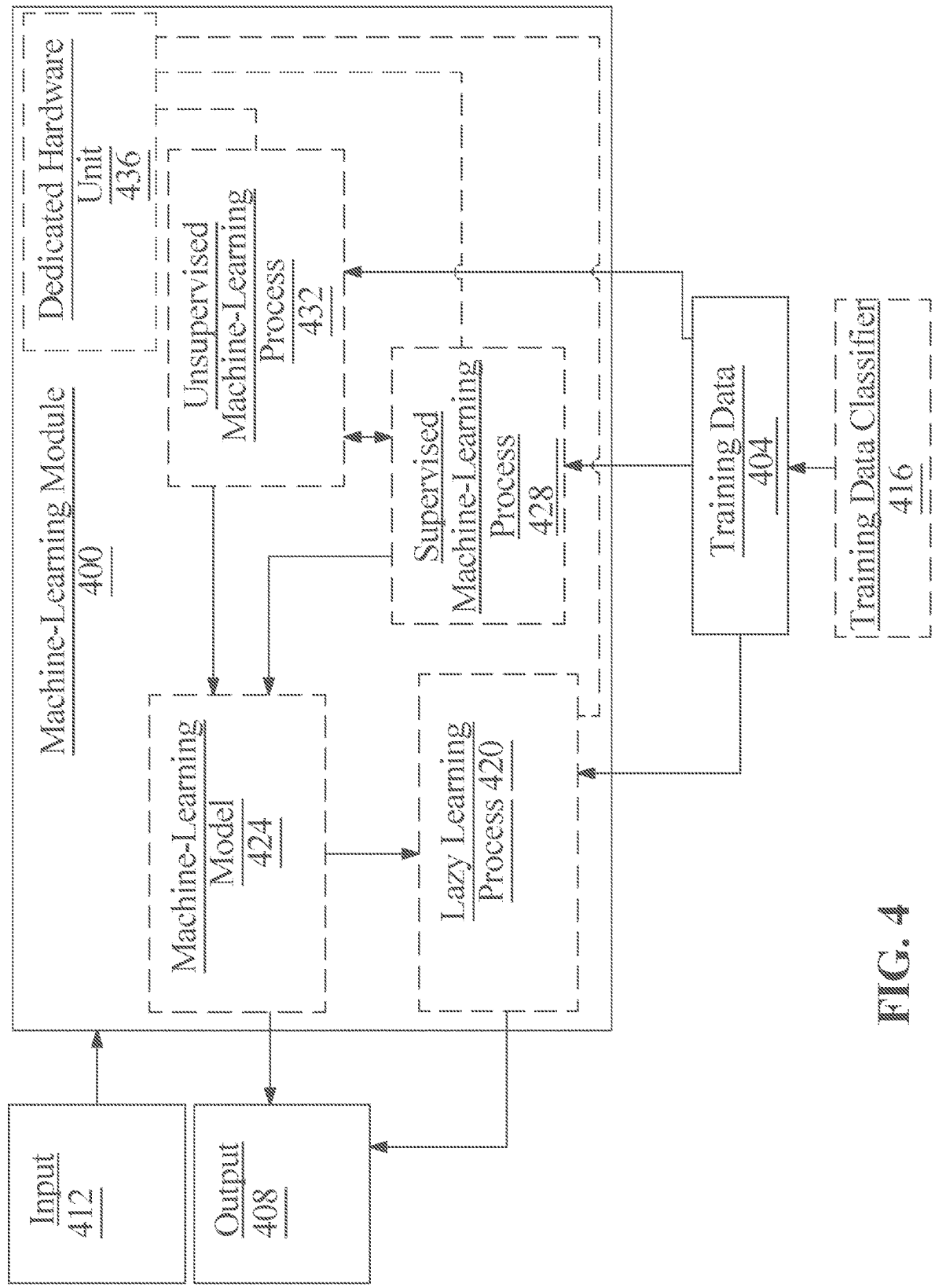
FIG. 4 illustrates an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include quality control data 112, degree of quality 144, or the like. As another non-limiting illustrative example, output data may include degree of quality 144, swappable component 148, or the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a cohort of functioning component 116, component unit 120, cluster 124, or the like. For example, and without limitation, training data classifier 416 may classify elements of training data to different versions, manufacturers or manufacturing date of functioning component 116, the date of a creation of component unit 120 or cluster 124, different managing users of component unit 120 or cluster 124, or the like.

Still referring to FIG. 4, computing device 404 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 404 may then calculate a likelihood table by calculating probabilities of different data entries and classification labels. Computing device 404 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 404 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value X min in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation a of a set or subset of values:

$$X_{new} = \frac{X - X_{mean}}{\sigma}.$$

Scaling may be performed using a median value of a set or subset)(median and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include quality control data 112, degree of quality 144, or the like as described above as inputs, degree of quality 144, swappable component 148, or the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
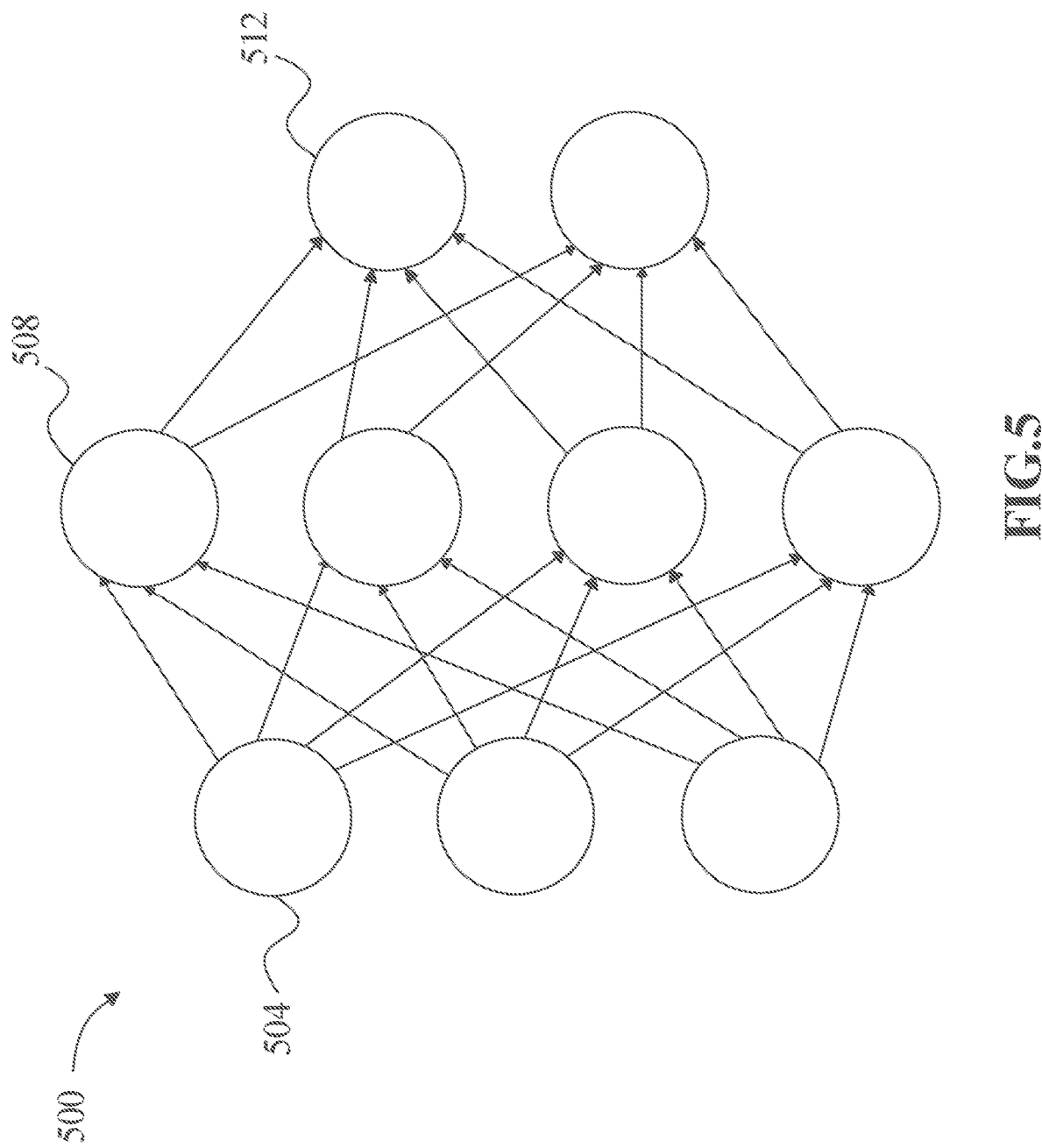
FIG. 5 illustrates an exemplary embodiment of neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
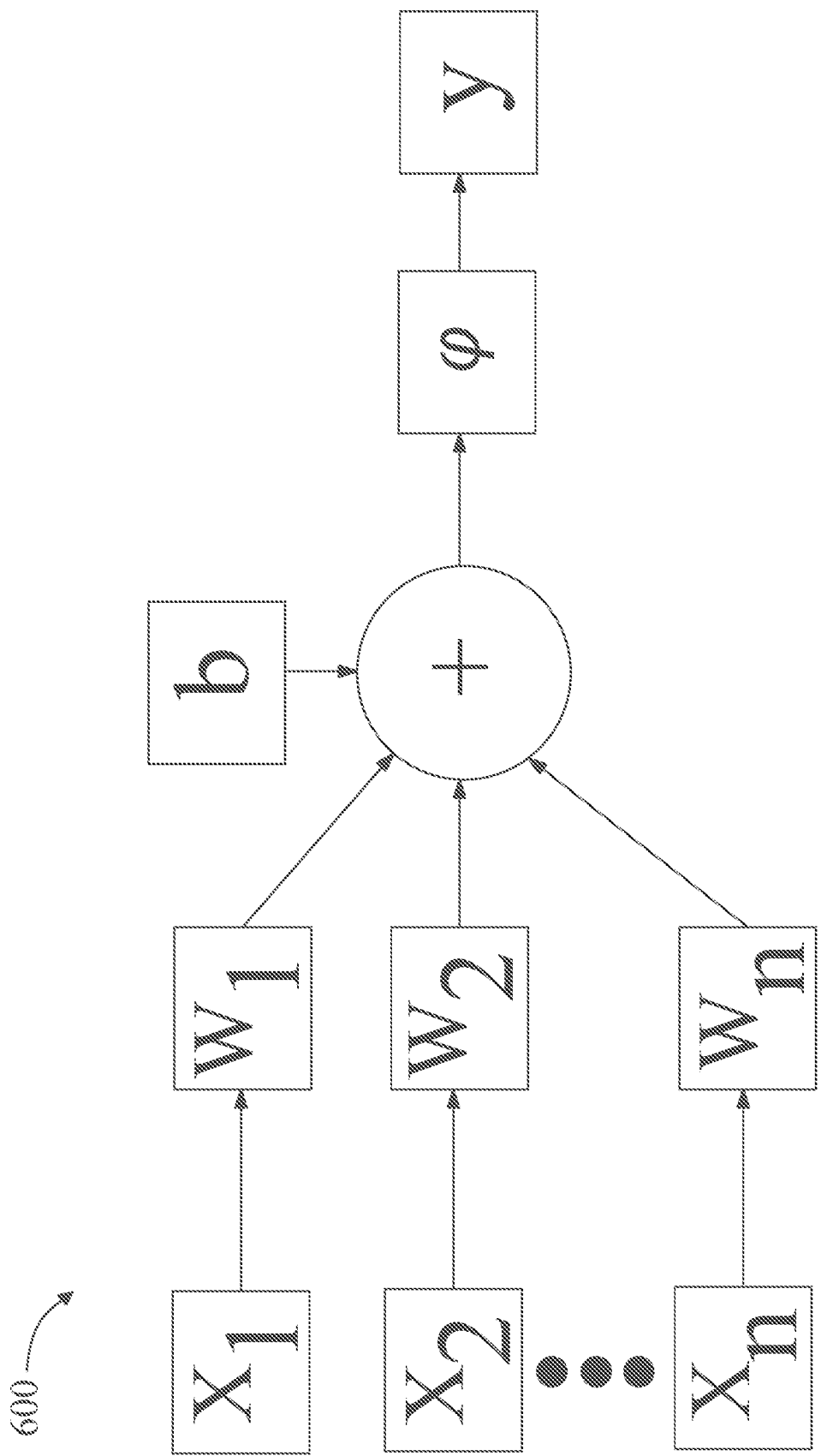
FIG. 6 illustrates an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as ƒ(x)=tan h²(x), a rectified linear unit function such as ƒ(x)=max (0, x), a "leaky" and/or "parametric" rectified linear unit function such as ƒ(x)=max (ax, x) for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a[1+\tan h\ (\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
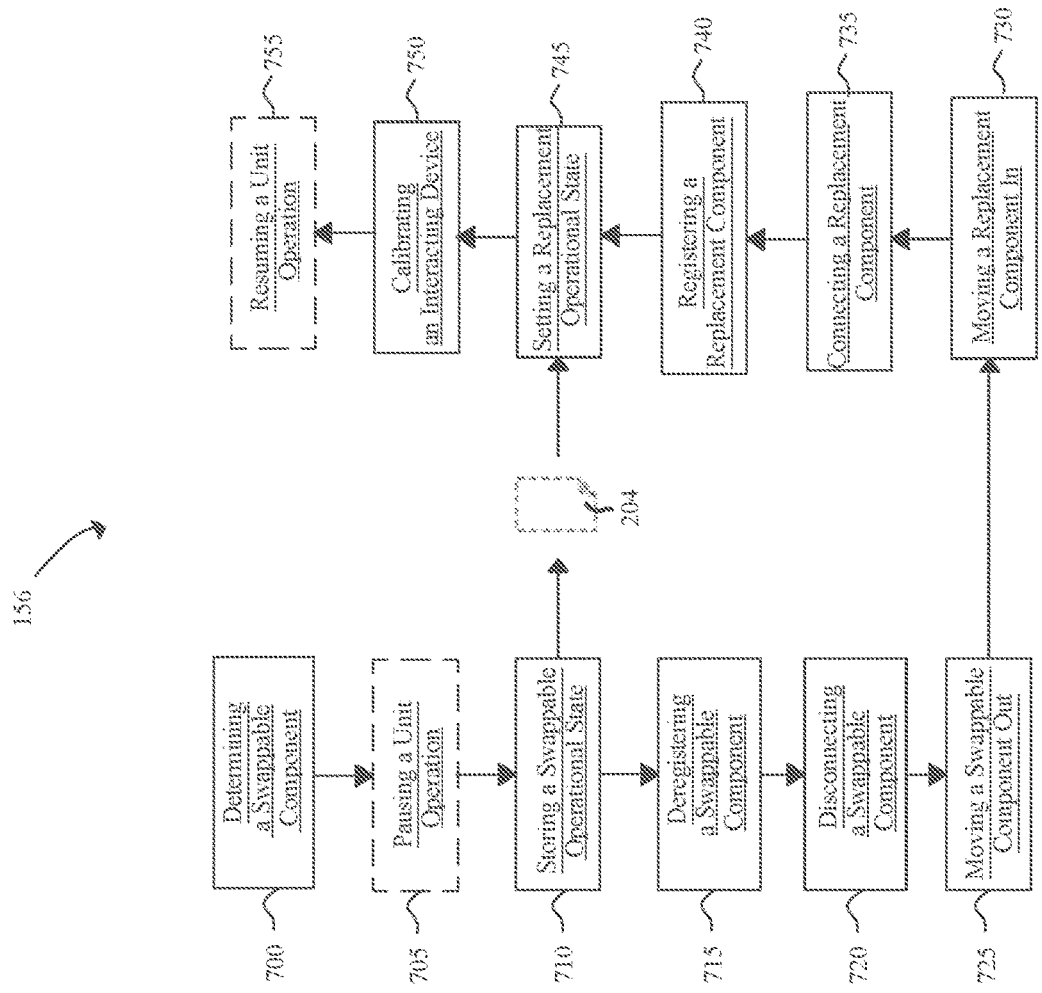
FIG. 7 illustrates a flow diagram of an exemplary hot-swap procedure.

Referring now to FIG. 7, a flow diagram of an exemplary hot-swap procedure 156 is illustrated. In a step 700, processor 104 may determine swappable component 148 and the determination of swappable component 148 may initiate hot-swap procedure 156. This may be implemented as described with respect to FIGS. 1-6.

With continued reference to FIG. 7, hot-swap procedure 156 may include a step 705 of optionally pausing a unit operation. For the purposes of this disclosure, a "unit operation" is any tracks that a component unit performs. In a non-limiting example, unit operation may include scanning a microscope slide and generate an image of the microscope slide. In another non-limiting example, unit operation may include executing instructions of a computer program. In another non-limiting example, unit operation may include storing data into a hard drive. Unit operation may include any task that component unit can perform. These may be implemented as described with respect to FIGS. 1-6.

With continued reference to FIG. 7, hot-swap procedure 156 may include a step 710 of storing a swappable operational state 212 of swappable component 148. In some cases, swappable operational state 212 may include data structure. As a non-limiting example, swappable operational state 212 of swappable component 148 may include a state of swappable component 148 in scanning process, calibration, execution of specific instructions, powering an object, or the like. As another non-limiting example, swappable operational state 212 of swappable component 148 may include parameters of swappable component 148 set to operate. For example, and without limitation, swappable operational state 212 of swappable component 148 may include a level of resolution, magnification, color depth, focus, pixel calibration, color calibration, or the like. In some embodiments, swappable operational state 212 may be stored in hot-swap data store 136 or database. These may be implemented as described with respect to FIGS. 1-6.

With continued reference to FIG. 7, hot-swap procedure 156 may include a step 715 of deregistering a swappable component 148 from a component unit 120 of cluster 124. In a non-limiting example, deregistration 168 of swappable component 148 from component unit 120 of cluster 124 may include updating system records, configurations, or software settings to reflect the removal of swappable component 148. This may ensure that component unit 120 and/or cluster 124 operates correctly without the presence of the deregistered swappable component 148. For example, and without limitation, cluster 124 may operate to scan microscope slide using an interacting device 128 and functioning components 116 in a component unit 120 of cluster 124 while swappable component 148 is removed from the component unit 120. In some cases, deregistration 168 of swappable component 148 may include updating entries in a database. In a non-limiting example, processor 104 may be configured to remove information, such as but not limited to unique identifier of swappable component 148, information related to swappable component 148, or the like, in hot-swap data store 136. These may be implemented as described with respect to FIGS. 1-6.

With continued reference to FIG. 7, hot-swap procedure 156 may include a step 720 of disconnecting a swappable component 148 from a component unit 120 of cluster 124. In a non-limiting example, disconnecting a swappable component 148 may include breaking a circuit connection of swappable component 148 in component unit 120. In another non-limiting example, disconnecting a swappable component 148 may include disabling a network interface. In another non-limiting example, disconnecting a swappable component 148 may include disconnecting a gear, unclamping a joint, or the like of swappable component 148 from component unit 120. These may be implemented as described with respect to FIGS. 1-6.

With continued reference to FIG. 7, hot-swap procedure 156 may include a step 725 of moving a swappable component 148 out from a component unit 120 of cluster 124. In a non-limiting example, swapping device 172 may be configured to move swappable component 148 out from a component unit 120 of cluster 124. In another non-limiting example, a user may manually move swappable component 148 out from a component unit 120 of cluster 124. These may be implemented as described with respect to FIGS. 1-6.

With continued reference to FIG. 7, hot-swap procedure 156 may include a step 730 of moving a replacement component 152 into a component unit 120 of cluster 124. In a non-limiting example, swapping device 172 may be configured to move replacement component 152 into a component unit 120 of cluster 124. In another non-limiting example, a user may manually move replacement component 152 into a component unit 120 of cluster 124. These may be implemented as described with respect to FIGS. 1-6.

With continued reference to FIG. 7, hot-swap procedure 156 may include a step 735 of connecting a replacement component 152 with a component unit 120 of cluster 124. In a non-limiting example, connecting a replacement component 152 may include connecting a circuit connection of replacement component 152 to component unit 120. In another non-limiting example, connecting a replacement component 152 may include enabling a network interface of replacement component 152. In another non-limiting example, connecting a replacement component 152 may include connecting a gear, unclamping a joint, or the like of swappable component 148 to component unit 120. These may be implemented as described with respect to FIGS. 1-6.

With continued reference to FIG. 7, hot-swap procedure 156 may include a step 740 of registering a replacement component 152 to a component unit 120 of cluster 124. In a non-limiting example, registration 176 of replacement component 152 into component unit 120 of cluster 124 may include updating system records, configurations, or software settings to reflect the addition or registration 176 of swappable component 148. This may ensure that component unit 120 and/or cluster 124 operates correctly with the presence of the registered replacement component 152. For example, and without limitation, cluster 124 may operate to scan microscope slide using an interacting device 128 and functioning components 116 in a component unit 120 of cluster 124 with replacement component 152 added into the component unit 120. In some cases, registration 176 of replacement component 152 may include updating entries in a database. In a non-limiting example, processor 104 may be configured to modify or add information, such as but not limited to unique identifier of replacement component 152, information related to replacement component 152, or the like, in hot-swap data store 136. These may be implemented as described with respect to FIGS. 1-6.

With continued reference to FIG. 7, hot-swap procedure 156 may include a step 745 of setting a replacement operational state using swappable operational state 212. Replacement operational state of replacement component 152 may be set to the value of swappable operational state of swappable component 148 to allow smooth registration of replacement component 152 in place of swappable component 148 and smooth operation of replacement component 152 without disrupting any operations of other functioning components 116 in component unit 120 of cluster 124. These may be implemented as described with respect to FIGS. 1-6.

With continued reference to FIG. 7, hot-swap procedure 156 may include a step 750 of calibrating an interacting device 128. In some embodiments, processor 104 may be configured to calibrate an operation position of interacting device 128. In a non-limiting example, operation position may include a specific orientation or position of interacting device 128 to place a gripping object on functioning component 116 and/or replacement component 152. In some embodiments, processor 104 may be configured to calibrate an operation position of interacting device 128 as a function of a replacement component position in cluster 124 with respect to a position of interacting device 128. In some embodiments, processor 104 may be configured to determine replacement component position with respect to a position of an interacting device 128 in at least a cluster 124 using a fiducial marker of replacement component 152. These may be implemented as described with respect to FIGS. 1-6.

With continued reference to FIG. 7, hot-swap procedure 156 may include a step 755 of optionally resuming a unit operation. This may be implemented as described with respect to FIGS. 1-6.

Figure 8:
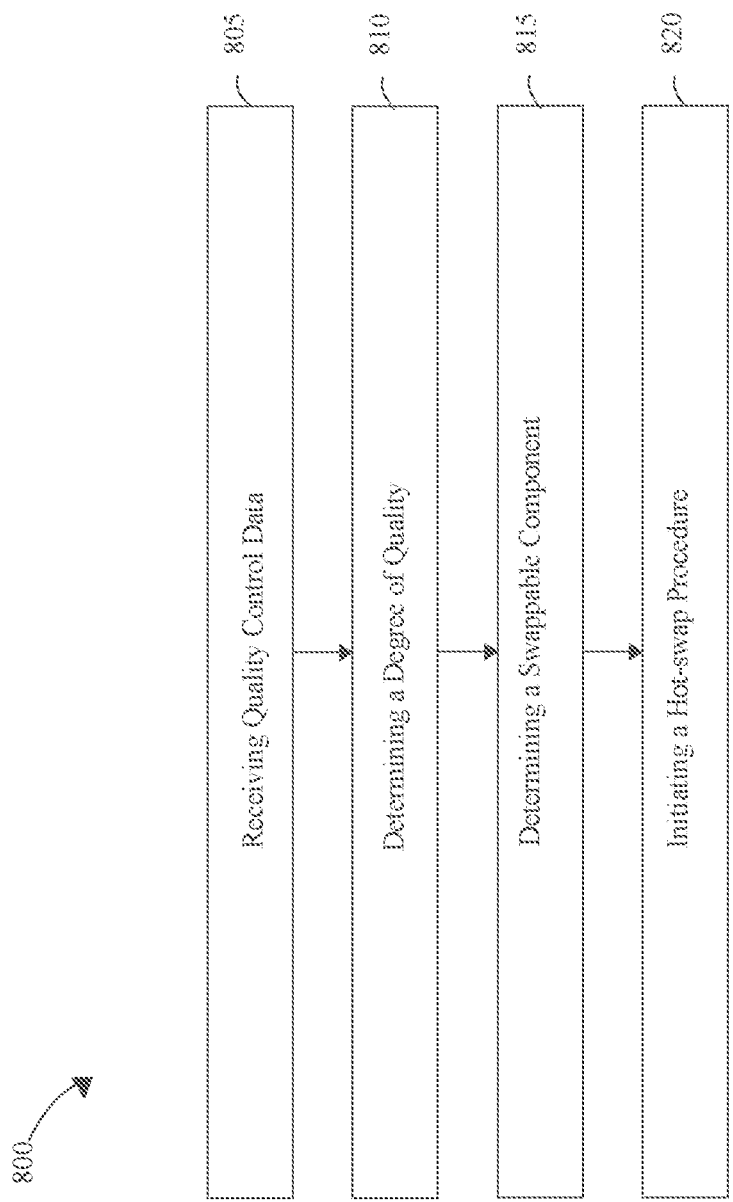
FIG. 8 illustrates a flow diagram of an exemplary method of hot-swapping a component of a component unit in a cluster.

Referring now to FIG. 8, a flow diagram of an exemplary method 800 of hot-swapping a component of a component unit in a cluster is illustrated. Method 800 includes a step 805 of receiving, using at least a processor, quality control data from each functioning component of a component unit in at least a cluster. In some embodiments, method 800 may further include analyzing, using the at least a processor, an image of a microscope slide using a machine vision model to obtain the quality control data. These may be implemented as described with respect to FIGS. 1-7.

With continued reference to FIG. 8, method 800 incudes a step 810 of determining, using at least a processor, a degree of quality of each functioning component of a component unit in at least a cluster as a function of quality control data. In some embodiments, method 800 may further include generating, using the at least a processor, quality training data, wherein the quality training data may include correlations between exemplary quality control data and exemplary degrees of quality, training, using the at least a processor, a quality machine-learning model using the quality training data and determining, using the at least a processor, the degree of quality using the trained quality machine-learning model. These may be implemented as described with respect to FIGS. 1-7.

With continued reference to FIG. 8, method 800 incudes a step 815 of determining, using at least a processor, a swappable component in a component unit of at least a cluster as a function of a degree of quality. In some embodiments, method 800 may further include generating, using the at least a processor, swappable component training data, wherein the swappable training data may include correlations between exemplary quality control data and exemplary swappable components, training, using the at least a processor, a swappable component machine-learning model using the swappable component training data and determining, using the at least a processor, the swappable component using the trained swappable component machine-learning model. These may be implemented as described with respect to FIGS. 1-7.

With continued reference to FIG. 8, method 800 incudes a step 820 of initiating, using at least a processor, a hot-swap procedure for a swappable component, wherein initiating the hot-swap procedure includes deregistering the swappable component from a component unit of at least a cluster, wherein deregistering the swappable component includes updating entries in a database to reflect a removal of the swappable component and registering a replacement component in place of the swappable component to the component unit of the at least a cluster, wherein registering the swappable component includes updating the entries in the database to reflect an addition of the replacement component. In some embodiments, method 800 may further include receiving, using the at least a processor, a user input, wherein the user input may include a hot-swap confirmation and initiating, using the at least a processor, the hot-swap procedure as a function of the user input. In some embodiments, method 800 may further include storing, using the at least a processor, a swappable operational state of the swappable component in a hot-swap data store and setting, using the at least a processor, a replacement operational state of the replacement component to the stored swappable operational state. In some embodiments, method 800 may further include determining, using the at least a processor, a replacement component position with respect to a position of an interacting device in the at least a cluster using a fiducial marker of the replacement component. In some embodiments, method 800 may further include calibrating, using the at least a processor, an operation position of the interacting device as a function of the position of the replacement component. In some embodiments, method 800 may further include generating, using the at least a processor, an indicating datum as a function of a completion of the hot-swap procedure. In some embodiments, method 800 may further include generating, using the at least a processor, a hot-swap command for a swapping device to replace the swappable component with the replacement component. These may be implemented as described with respect to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
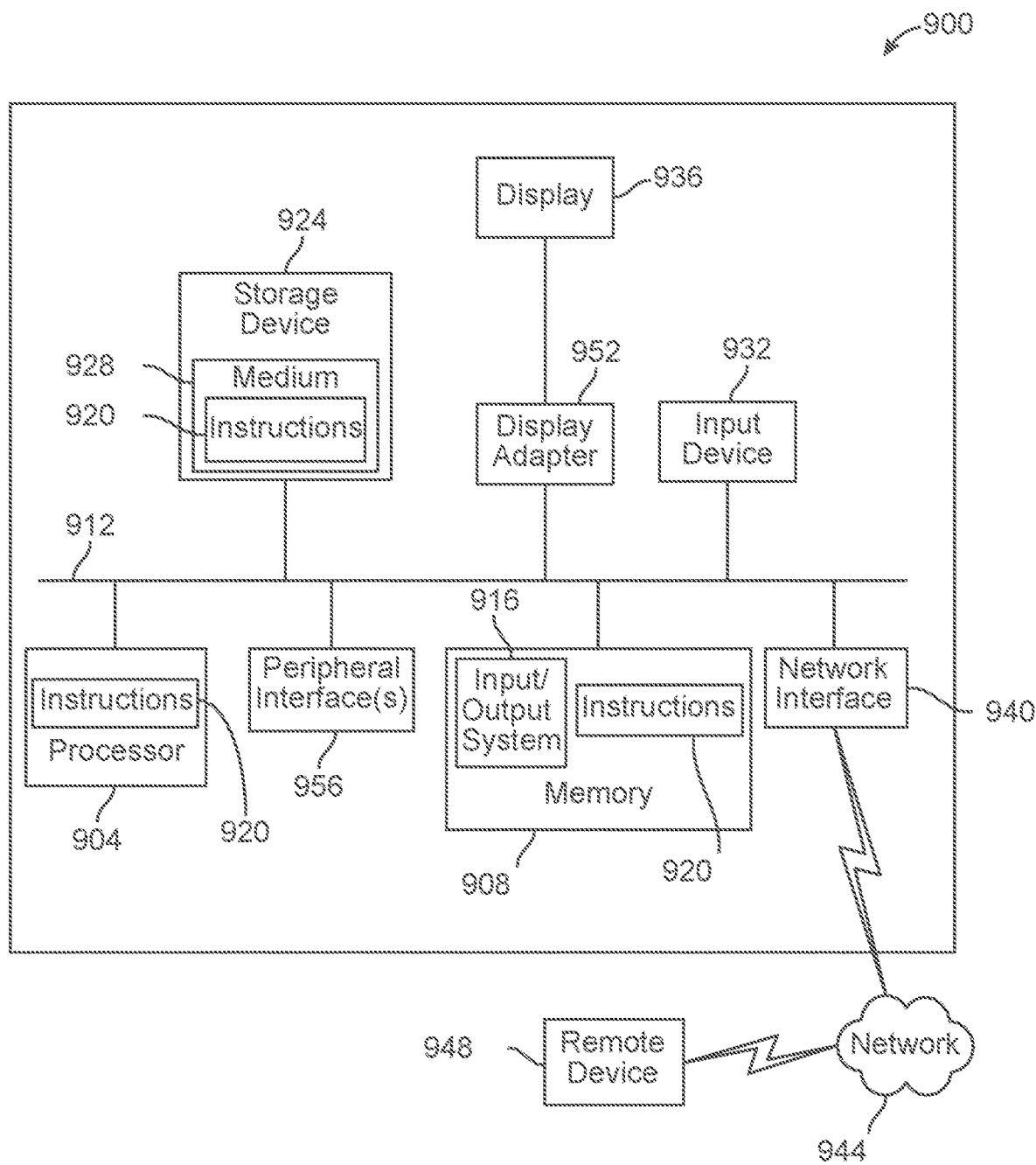
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912.

Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more of other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for hot-swapping a component of a component unit in at least a cluster, the apparatus comprising:
   at least a processor; and
   a memory communicatively connected to the at least a processor, the memory contains instructions configuring the at least a processor to:
      receive quality control data from each functioning component of a component unit in at least a cluster;
      determine a degree of quality of each functioning component of the component unit in the at least a cluster as a function of the quality control data;
      determine a swappable component in the component unit in the at least a cluster as a function of the degree of quality of each functioning component of the component unit in the at least a cluster; and
      initiate a hot-swap procedure for the swappable component, wherein initiating the hot-swap procedure for the swappable component comprises:
         deregistering the swappable component from the component unit in the at least a cluster, wherein deregistering the swappable component from the component unit in the at least a cluster comprises updating entries in a database to reflect a removal of the swappable component; and
         registering a replacement component in place of the swappable component to the component unit in the at least a cluster, wherein registering the replacement component in place of the swappable component to the component unit in the at least a cluster comprises updating the entries in the database to reflect an addition of the replacement component.

2. The apparatus of claim 1, wherein the memory contains instructions further configuring the at least a processor to:
   analyze an image of a microscope slide using a machine vision model to obtain the quality control data.

3. The apparatus of claim 1, wherein the memory contains instructions further configuring the at least a processor to:
   generate quality training data, wherein the quality training data comprises correlations between exemplary quality control data and exemplary degrees of quality;
   train a quality machine-learning model using the quality training data; and
   determine the degree of quality of each functioning component of the component unit in the at least a cluster using the trained quality machine-learning model.

4. The apparatus of claim 1, wherein the memory contains instructions further configuring the at least a processor to:
   generate swappable component training data, wherein the swappable component training data comprises correlations between exemplary quality control data and exemplary swappable components;
   train a swappable component machine-learning model using the swappable component training data; and
   determine the swappable component using the trained swappable component machine-learning model.

5. The apparatus of claim 1, wherein the memory contains instructions further configuring the at least a processor to:
- receive a user input, wherein the user input comprises a hot-swap confirmation; and
- initiate the hot-swap procedure for the swappable component as a function of the user input.

6. The apparatus of claim 1, wherein the memory contains instructions further configuring the at least a processor to:
- store a swappable operational state of the swappable component in a hot-swap data store; and
- set a replacement operational state of the replacement component to the stored swappable operational state of the swappable component.

7. The apparatus of claim 1, wherein the memory contains instructions further configuring the at least a processor to:
- determine a position of the replacement component with respect to a position of an interacting device in the at least a cluster using a fiducial marker of the replacement component.

8. The apparatus of claim 7, wherein the memory contains instructions further configuring the at least a processor to:
- calibrate an operation position of the interacting device as a function of the position of the replacement component.

9. The apparatus of claim 1, wherein the memory contains instructions further configuring the at least a processor to:
- generate an indicating datum as a function of a completion of the hot-swap procedure for the swappable component.

10. The apparatus of claim 1, wherein the memory contains instructions further configuring the at least a processor to:
- generate a hot-swap command for a swapping device to replace the swappable component with the replacement component.

11. A method of hot-swapping a component of a component unit in at least a cluster, the method comprising:
- receiving, using at least a processor, quality control data from each functioning component of a component unit in at least a cluster;
- determining, using the at least a processor, a degree of quality of each functioning component of the component unit in the at least a cluster as a function of the quality control data;
- determining, using the at least a processor, a swappable component in the component unit in the at least a cluster as a function of the degree of quality of each functioning component of the component unit in the at least a cluster; and
- initiating, using the at least a processor, a hot-swap procedure for the swappable component, wherein initiating the hot-swap procedure for the swappable component comprises:
  - deregistering the swappable component from the component unit in the at least a cluster, wherein deregistering the swappable component from the component unit in the at least a cluster comprises updating entries in a database to reflect a removal of the swappable component; and
  - registering a replacement component in place of the swappable component to the component unit in the at least a cluster, wherein registering the replacement component in place of the swappable component to the component unit in the at least a cluster comprises updating the entries in the database to reflect an addition of the replacement component.

12. The method of claim 11, further comprising:
- analyzing, using the at least a processor, an image of a microscope slide using a machine vision model to obtain the quality control data.

13. The method of claim 11, further comprising:
- generating, using the at least a processor, quality training data, wherein the quality training data comprises correlations between exemplary quality control data and exemplary degrees of quality;
- training, using the at least a processor, a quality machine-learning model using the quality training data; and
- determining, using the at least a processor, the degree of quality of each functioning component of the component unit in the at least a cluster using the trained quality machine-learning model.

14. The method of claim 11, further comprising:
- generating, using the at least a processor, swappable component training data, wherein the swappable component training data comprises correlations between exemplary quality control data and exemplary swappable components;
- training, using the at least a processor, a swappable component machine-learning model using the swappable component training data; and
- determining, using the at least a processor, the swappable component using the trained swappable component machine-learning model.

15. The method of claim 11, further comprising:
- receiving, using the at least a processor, a user input, wherein the user input comprises a hot-swap confirmation; and
- initiating, using the at least a processor, the hot-swap procedure for the swappable component as a function of the user input.

16. The method of claim 11, further comprising:
- storing, using the at least a processor, a swappable operational state of the swappable component in a hot-swap data store; and
- setting, using the at least a processor, a replacement operational state of the replacement component to the stored swappable operational state of the swappable component.

17. The method of claim 11, further comprising:
- determining, using the at least a processor, a position of the replacement component with respect to a position of an interacting device in the at least a cluster using a fiducial marker of the replacement component.

18. The method of claim 17, further comprising:
- calibrating, using the at least a processor, an operation position of the interacting device as a function of the position of the replacement component.

19. The method of claim 11, further comprising:
- generating, using the at least a processor, an indicating datum as a function of a completion of the hot-swap procedure for the swappable component.

20. The method of claim 11, further comprising:
- generating, using the at least a processor, a hot-swap command for a swapping device to replace the swappable component with the replacement component.

* * * * *